(12) United States Patent
Burek et al.

(10) Patent No.: US 10,444,435 B2
(45) Date of Patent: Oct. 15, 2019

(54) RIBBON TRANSITION TOOL

(71) Applicant: OFS Fitel, LLC, Norcross, GA (US)

(72) Inventors: Denis Edward Burek, Cumming, GA (US); Yue Liang, Peachtree, GA (US)

(73) Assignee: OFS FITEL, LLC, Norcross, GA (US)

( * ) Notice: Subject to any disclaimer, the term of this patent is extended or adjusted under 35 U.S.C. 154(b) by 245 days.

(21) Appl. No.: 15/600,685

(22) Filed: May 19, 2017

(65) Prior Publication Data

US 2017/0336566 A1   Nov. 23, 2017

Related U.S. Application Data

(60) Provisional application No. 62/338,701, filed on May 19, 2016, provisional application No. 62/394,910, filed on Sep. 15, 2016, provisional application No. 62/394,961, filed on Sep. 15, 2016, provisional application No. 62/396,439, filed on Sep. 19, 2016.

(51) Int. Cl.
*G02B 6/255* (2006.01)
*G02B 6/25* (2006.01)
*G02B 6/44* (2006.01)

(52) U.S. Cl.
CPC .............. *G02B 6/2553* (2013.01); *G02B 6/25* (2013.01); *G02B 6/2551* (2013.01); *G02B 6/2555* (2013.01); *G02B 6/4403* (2013.01)

(58) Field of Classification Search
CPC .... G02B 6/448; G02B 6/4403; G02B 6/2553; G02B 6/25; G02B 6/2551; G02B 6/4404; G02B 6/4409; G02B 6/4497; G02B 6/4498; B65H 1/00; B29C 48/30; B29C 48/305; B29C 70/20
See application file for complete search history.

(56) References Cited

U.S. PATENT DOCUMENTS

| | | | | | |
|---|---|---|---|---|---|
| 4,287,558 | A | * | 9/1981 | Nishitani | ............. G01S 7/2806 710/57 |
| 4,305,642 | A | * | 12/1981 | Bloodworth, Jr. | ... G02B 6/4403 385/114 |
| 4,364,788 | A | * | 12/1982 | Bloodworth, Jr. | ... G02B 6/3878 156/158 |
| 4,426,344 | A | * | 1/1984 | Dinter | ...................... B32B 3/30 264/173.15 |

(Continued)

*Primary Examiner* — Ryan A Lepisto
*Assistant Examiner* — Erin D Chiem
(74) *Attorney, Agent, or Firm* — Daniel Kim, Esq.; Jacobs + Kim LLP

(57) ABSTRACT

A ribbon transition tool modifies a 200 μm ribbon for splicing to a 250 μm ribbon. A spreader comb is fixedly mounted at the front end of the base of the tool. A straight comb is slidably mounted to the base behind the spreader comb. The combs each have a plurality of fiber channels corresponding to the fibers in the fiber ribbon. At the front end of the spreader comb, the channels have a spacing matching the initial spacing of the fiber ribbon. At the rear end of the spreader comb and throughout the straight comb, the channels have a spacing matching the modified spacing. An anvil is mounted into the base so as to be movable between a lowered position, in which the anvil lies underneath the straight comb, and a raised position, in which the anvil fills the gap between the combs when they are separated.

8 Claims, 18 Drawing Sheets

(56) References Cited

U.S. PATENT DOCUMENTS

| | | | | |
|---|---|---|---|---|
| 4,720,165 A | * | 1/1988 | Tokuda | G02B 6/448 156/166 |
| 4,741,684 A | * | 5/1988 | Cornelison | B29D 11/00663 425/114 |
| 5,067,226 A | * | 11/1991 | Egner | G02B 6/3809 29/419.1 |
| 5,915,055 A | * | 6/1999 | Bennett | G02B 6/2551 385/100 |
| 6,421,493 B1 | * | 7/2002 | Burek | G02B 6/3885 385/134 |
| 6,655,433 B1 | * | 12/2003 | Hirayama | G02B 6/448 156/180 |
| 2015/0063766 A1 | * | 3/2015 | Chen | G02B 6/2555 385/97 |

* cited by examiner

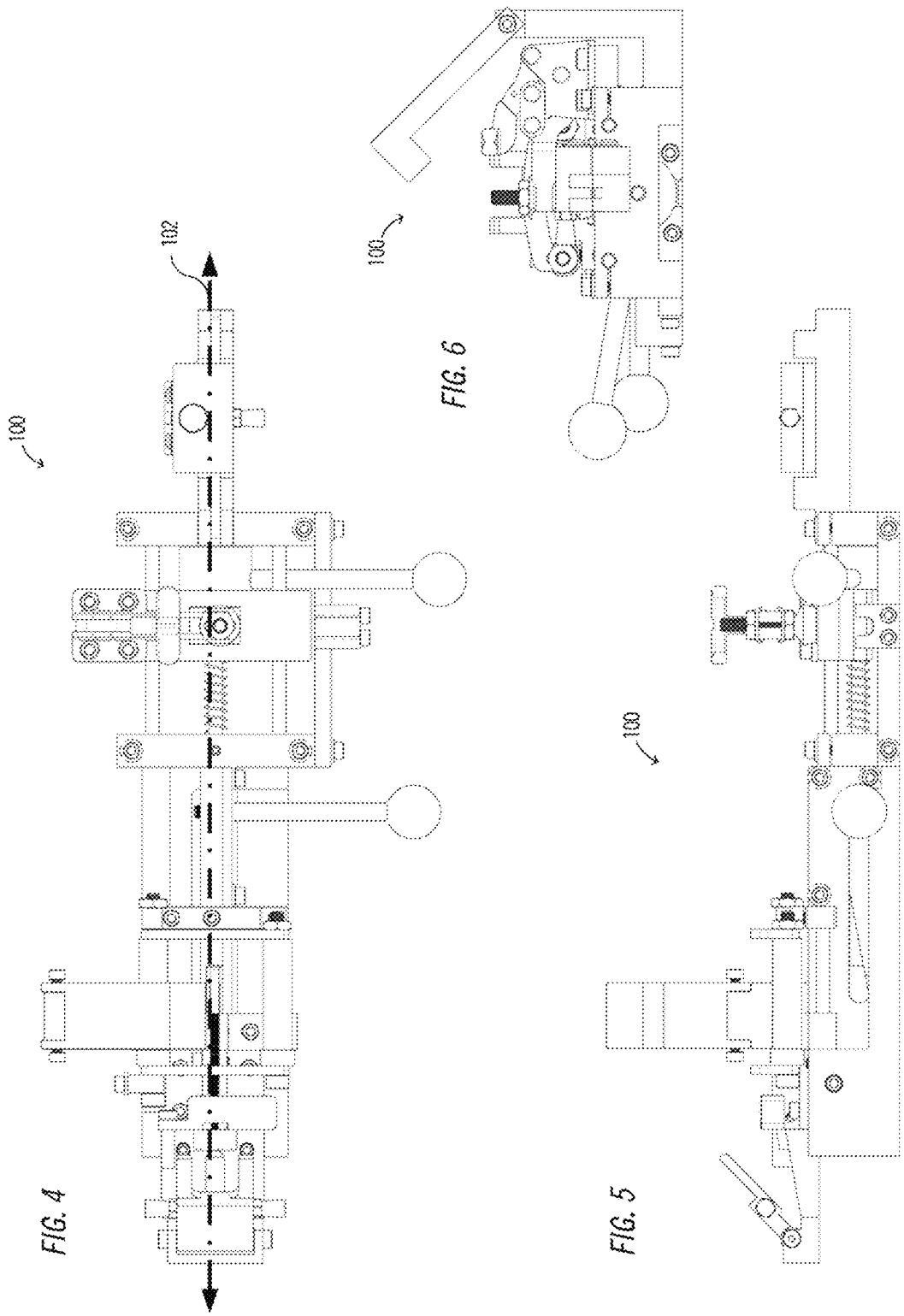

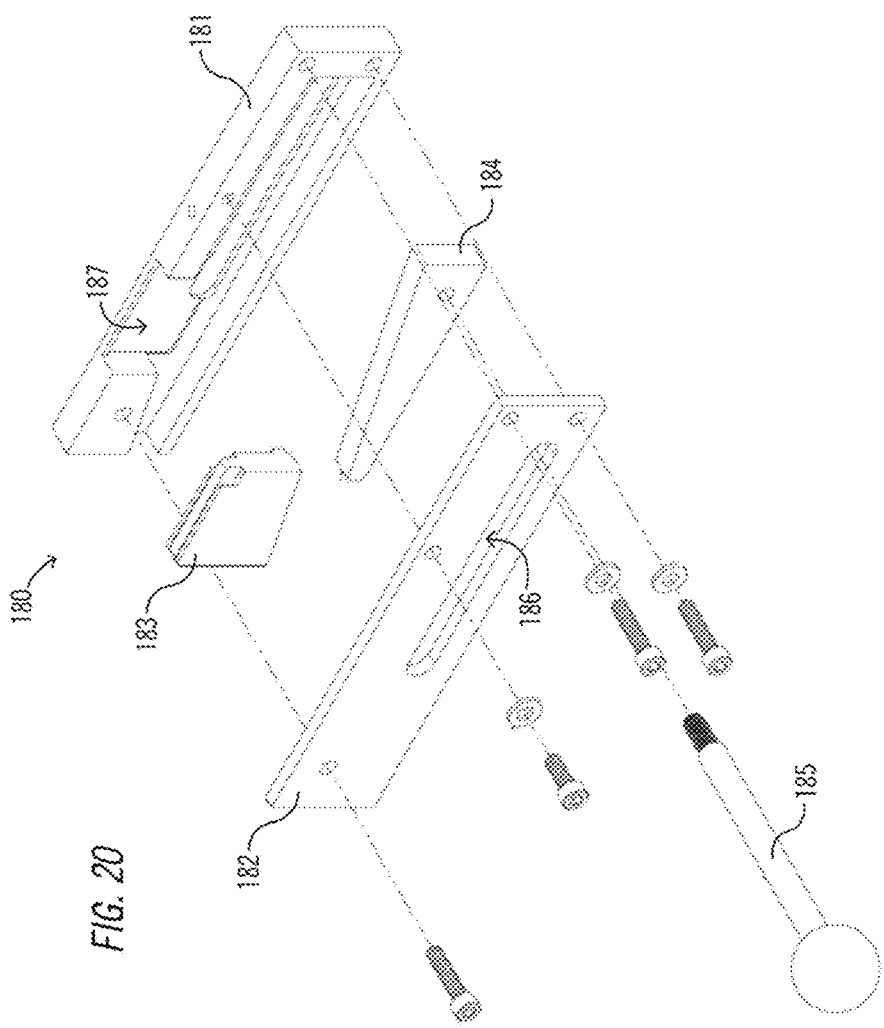
FIG. 20
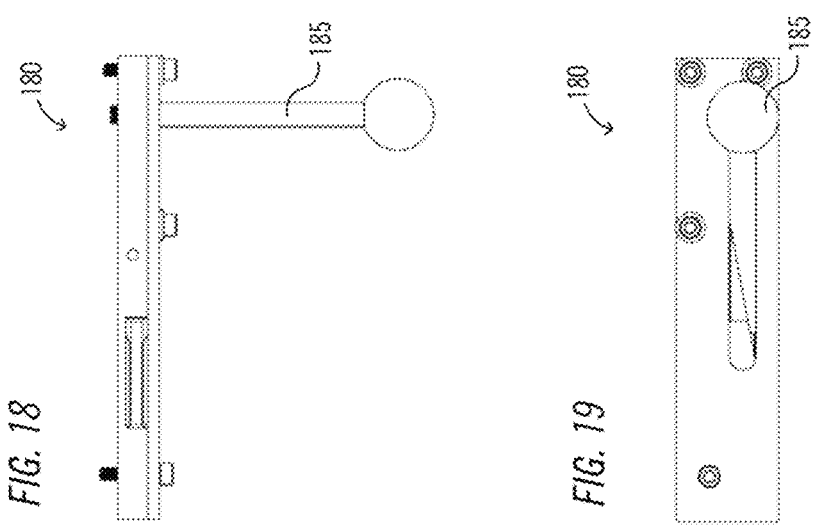
FIG. 18
FIG. 19

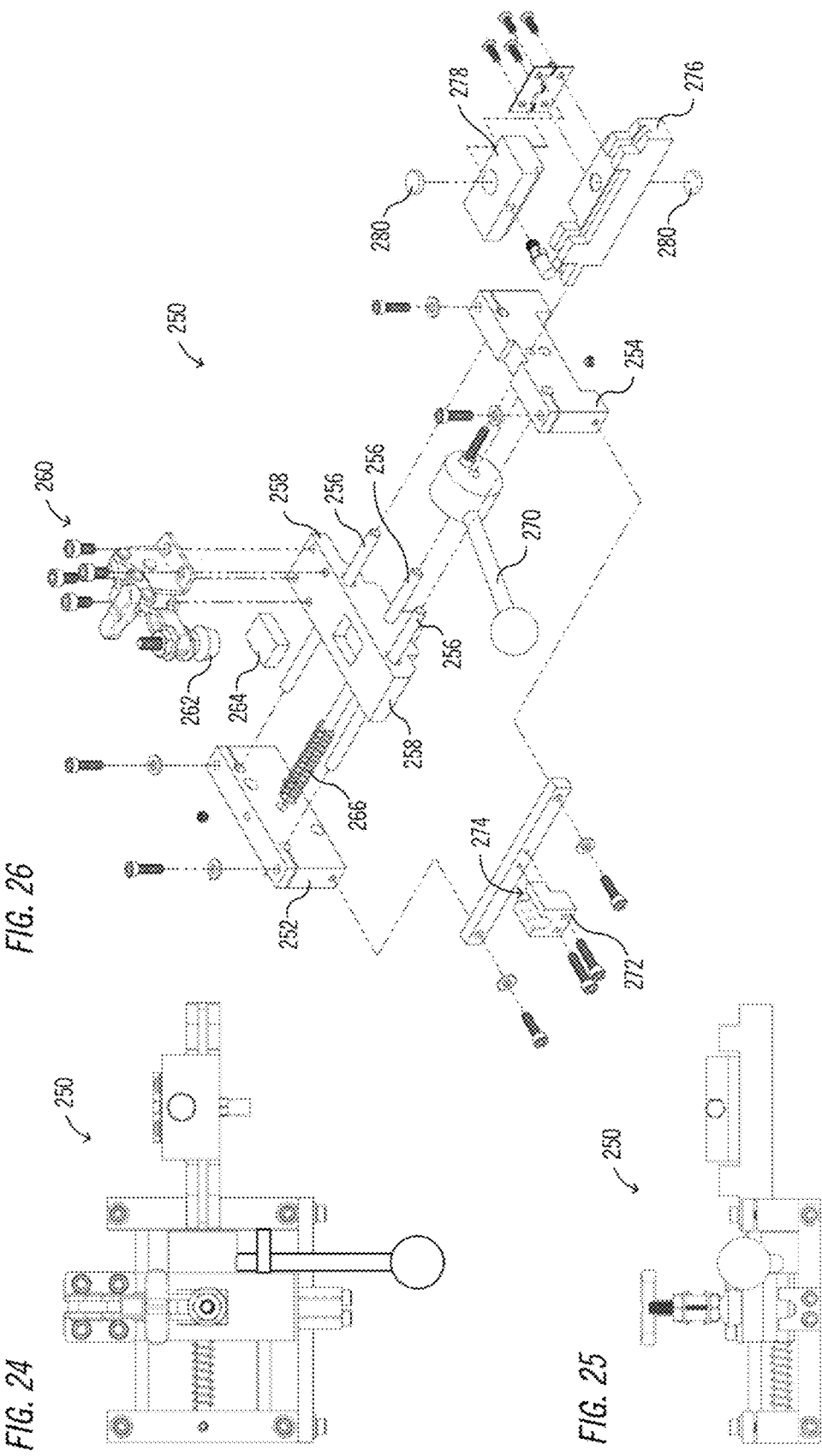

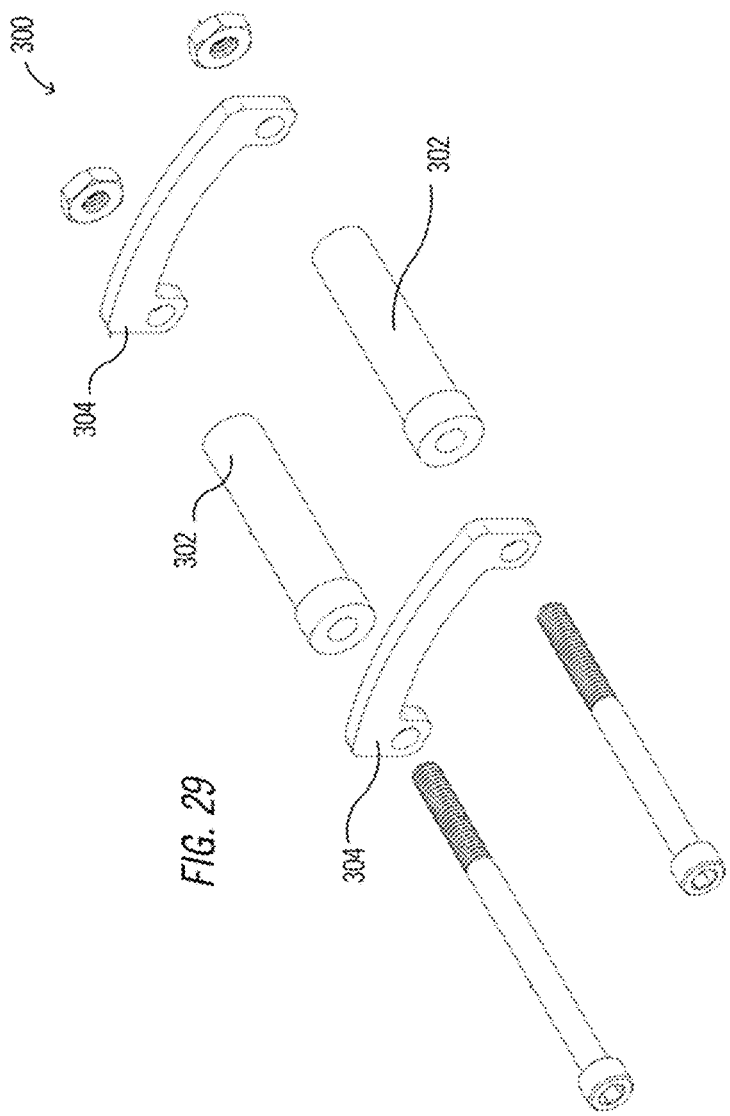
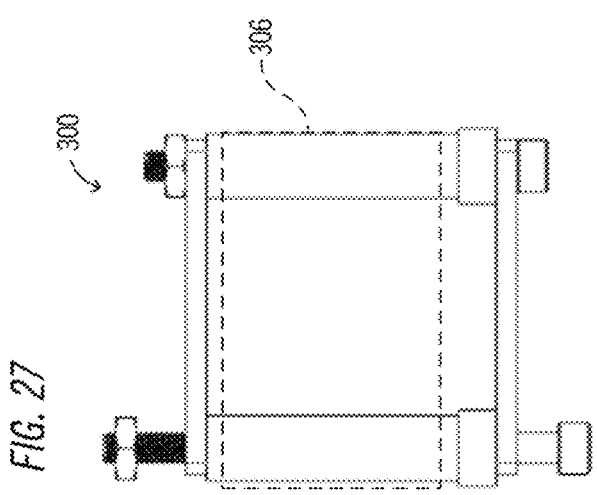
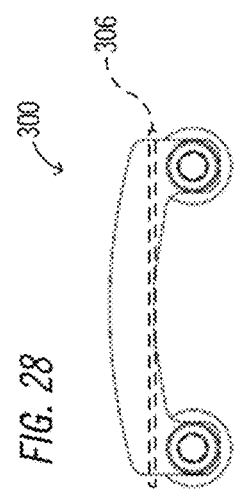

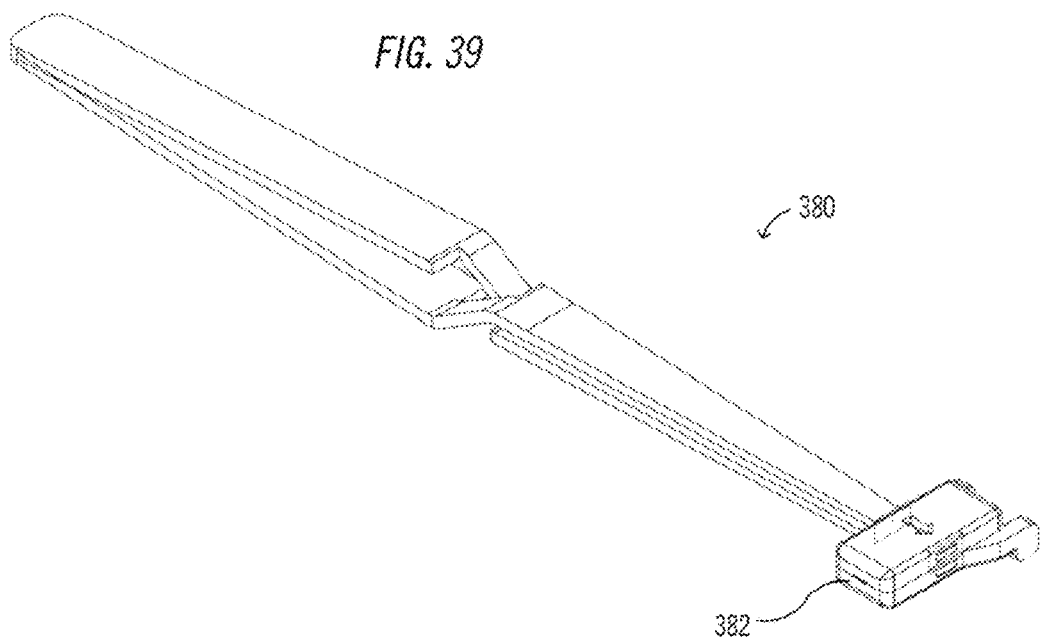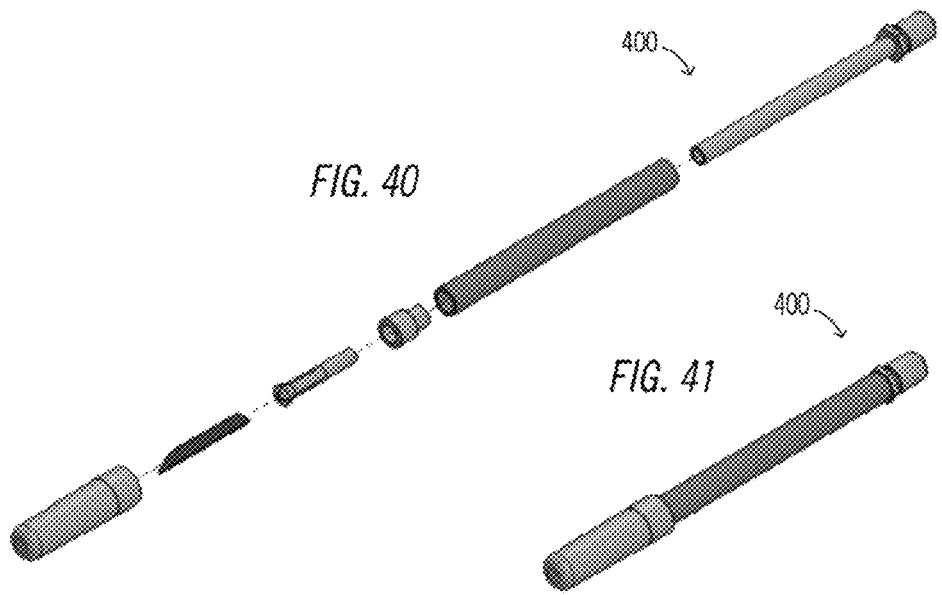

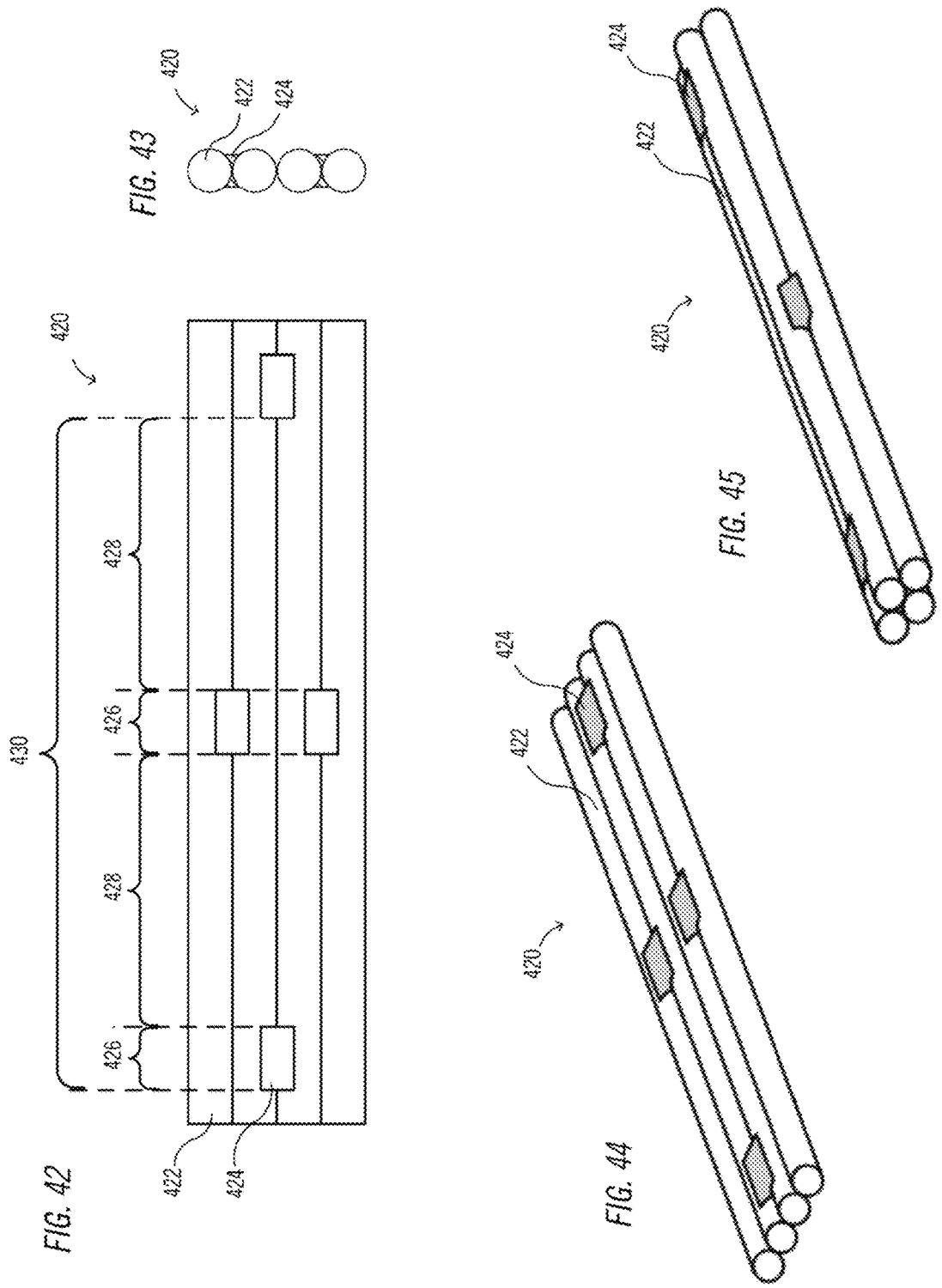

FIG. 46

| Ribbon type | Rollable Ribbon Short pitch | Rollable Ribbon Long pitch | Flat Ribbon |
|---|---|---|---|
| No. of fibers | 12 | 12 | 12 |
| Cross section | 450 452 454 | 460 462 464 | 470 472 474 |
| Structure | 454 452 Bonding part a: 10 mm Non-bonding part b: 10 mm Interval p: 40 mm | 464 462 Bonding part a: 30 mm Non-bonding part b: 10 mm Interval p: 80 mm | 474 472 |
| Dimension | Width: 3.06 mm Thickness: 0.26 mm | Width: 3.06 mm Thickness: 0.26 mm | Width: 3.1 mm Thickness: 0.31 mm |

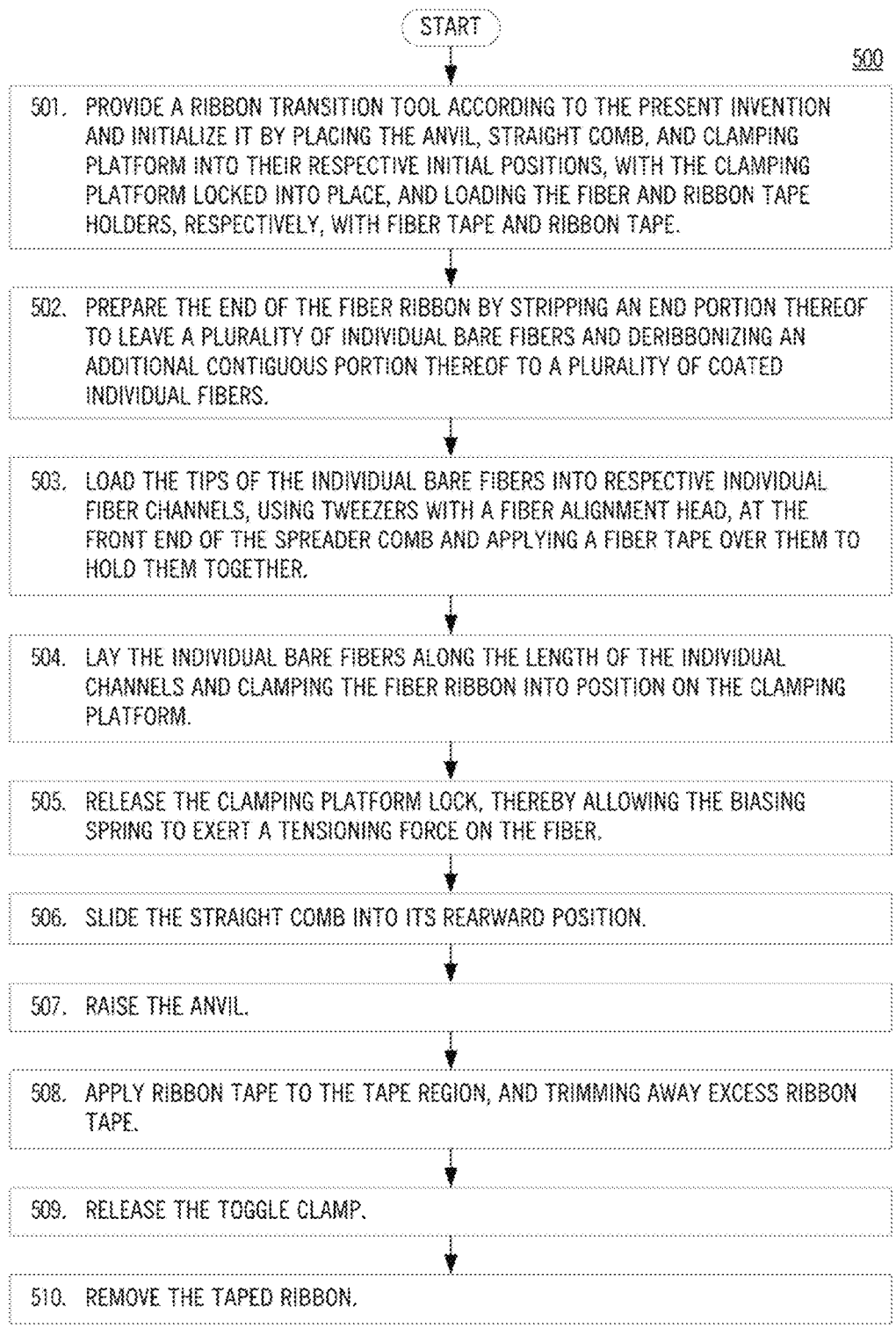

US 10,444,435 B2

RIBBON TRANSITION TOOL

CROSS REFERENCE TO RELATED APPLICATIONS

The present application claims the priority benefit of the following United States Provisional Patent Applications, which are all owned by the assignee of the present application, and which are incorporated herein by reference in their respective entirety:

U.S. Prov. Pat. App. No. 62/338,701 filed on May 19, 2016;

U.S. Prov. Pat. App. No. 62/394,910, filed on Sep. 15, 2016;

U.S. Prov. Pat. App. No. 62/394,961 filed on Sep. 15, 2016; and

U.S. Prov. Pat. App. No. 62/396,439 filed on Sep. 19, 2016.

FIELD OF THE INVENTION

The present invention relates generally to the field of fiber optics, and in particular to improved systems and techniques for splicing together fiber optic ribbons having different fiber spacings.

BACKGROUND ART

A ribbon fiber optic cable is a type of multifiber cable in which fibers are grouped into "ribbons," i.e., flat, ribbon-like structures formed by embedding a plurality of fibers in parallel in a plastic matrix. Fiber ribbons are commonly spliced together using a mass fusion splicer, which performs all of the individual fiber splices in parallel.

Currently available fiber ribbons typically have a fiber spacing of 250 µm, center-to-center. Recently, in order to increase fiber density, a ribbon fiber has been developed in which the fiber spacing has been reduced to 200 µm. The new design improves the data transmission capacity of a fiber ribbon cable in order to meet the fast-growing construction demands of data centers and Web 2.0-type networks.

There are times when a technician working in the field must splice a ribbon with a 200 µm fiber spacing to a ribbon having a 250 µm spacing. However, currently available mass fusion splicers are unable to perform such a splice.

SUMMARY OF INVENTION

An aspect of the invention is directed to a ribbon transition tool for modifying an end of a 200 µm ribbon to provide a fiber array having a spacing of 250 µm. A standard mass fusion splicer can then be used to splice the modified ribbon to a conventional 250 µm ribbon.

In an exemplary practice, the tool comprises a base having a front end and a rear end. A spreader comb is fixedly mounted at the front end of the base, and a straight comb is slidably mounted to the base between a forward position in which the front end of the straight comb abuts the rear end of the spreader comb, and a rearward position, in which there is a gap between the front end of the straight comb the rear end of the spreader comb.

The spreader comb and the straight comb each comprise a respective set of tines that define a plurality of individual fiber channels extending from the front end of the spreader comb to the rear end of the straight comb, wherein the plurality of individual fiber channels corresponds to individual fibers in the fiber ribbon. At the front end of the spreader comb, the plurality of individual fiber channels has a spacing matching the initial spacing of the fiber ribbon, and wherein, at the rear end of the spreader comb and throughout the straight comb, the plurality of individual fiber channels has a spacing matching the modified spacing.

An anvil is mounted into the base so as to be movable between a lowered position, in which the anvil is positioned underneath the straight comb, and a raised position, in which the anvil is positioned to fill the gap between the rear end of the spreader comb and the front end of the straight comb. The tool further includes means for anchoring the fiber ribbon at a first point in front of the spreader comb and means for anchoring the fiber ribbon at a second point behind the straight comb.

BRIEF DESCRIPTION OF THE DRAWINGS

FIGS. 4-6 show, respectively, plan, elevation, and right side views of the assembled tool.

FIGS. 18-20 show, respectively, a plan view, an elevation view, and an exploded view of an anvil lift subassembly.

FIGS. 24-26 show, respectively, a plan view, and an exploded perspective view of a ribbon clamping and tensioning subassembly.

FIGS. 27-29 show, respectively, a plan view, an elevation view, and an exploded perspective view of a ribbon tape holder.

FIG. 39 shows a perspective view of the tweezers used in an exemplary practice of the invention.

FIGS. 40 and 41 show, respectively, an exploded view and a perspective view of a feather razor suitable for this function.

FIGS. 42-44 show, respectively, a plan view, a side view, and a perspective view of an exemplary rollable fiber ribbon.

FIG. 45 shows a perspective view of the rollable fiber ribbon shown in FIGS. 42-44 in an unrolled flat configuration.

FIG. 46 shows a table setting forth the specifications for two exemplary rollable fiber ribbons and an exemplary flat fiber ribbon.

FIG. 47 shows a flowchart of a method according to an aspect of the invention.

DETAILED DESCRIPTION

Aspects of the invention are directed to a ribbon transition tool and associated techniques for modifying an end of a 200 μm fiber ribbon so as to provide an array of fibers having a spacing of 250 μm. In particular, the modified fiber ribbon is configured so that a mass fusion splicer can be used to simultaneously splice the fibers in the fiber array to corresponding fibers in a conventional 250 μm ribbon.

Figure 1:
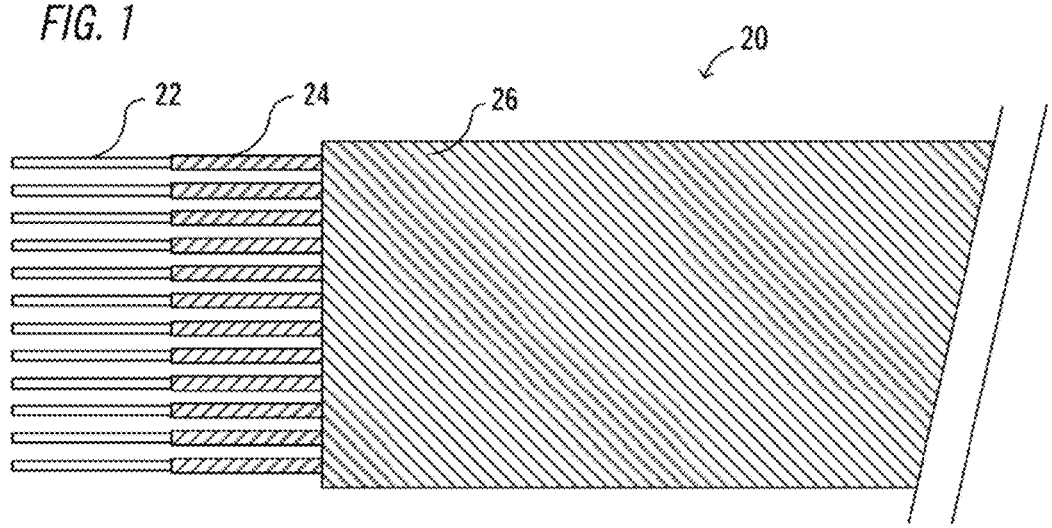
FIG. 1 shows a simplified plan view, not drawn to scale, of an end of an exemplary twelve-fiber ribbon to be modified by a ribbon transition tool according to the present invention.

FIG. 1 shows a simplified plan view, not drawn to scale, of an end of an exemplary twelve-fiber ribbon 20 to be modified by a ribbon transition tool according to the present invention. Exemplary ribbon 20 comprises twelve individual optical fibers 22, each surrounded by a respective coating 24. The 12 fibers 22 are embedded in a planar array in a suitable matrix material 26, and have a center-to-center spacing of 200 μm.

In an exemplary practice of the invention, the individual fibers are made out of silica, and the matrix 26 is made out of acrylate, or like material. However, it will be apparent the invention may be modified as necessary for use in conjunction with fibers or matrices made out of other materials. It is further noted that although the invention is described in the context of splicing a twelve-fiber ribbon having a spacing of 200 μm to a twelve-fiber fiber having a spacing of 250 μm, it will be apparent to a practitioner in the art that the invention may be adapted as needed for use in other contexts, including for example fiber ribbons having a different number of fibers or different spacings.

Figure 2:
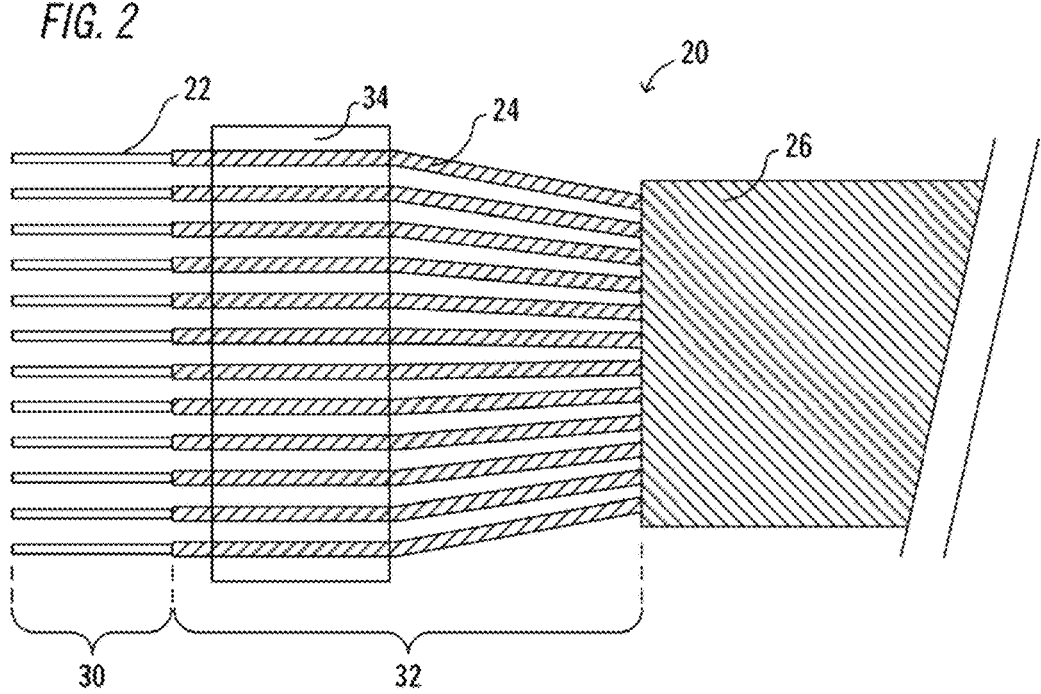
FIG. 2 shows a simplified plan view, not drawn to scale, of the FIG. 1 ribbon after it has been modified according to the present invention to provide a parallel fiber array having a center-to-center spacing of 250 µm.

FIG. 2 shows a simplified plan view, not drawn to scale, of the FIG. 1 ribbon after it has been modified according to the present invention to provide a parallel fiber array having a center-to-center spacing of 250 μm.

As shown in FIG. 2, the modified end of the fiber ribbon includes a stripped region 30 at the endmost portion of the ribbon, and a deribbonized region 32 immediately contiguous with the stripped region. As used herein, the term "stripped region" refers to a portion of a fiber ribbon from which the matrix material and all fiber coatings have been removed to leave a plurality of individual, bare silica fibers. The term "deribbonized region" refers to a portion of a fiber ribbon in which the matrix material has been removed to leave separate fibers with the coating intact.

The new configuration is maintained by means of a segment of adhesive tape 34 that has been applied across the deribbonized region. The modified ribbon can then be spliced to another ribbon using standard mass fusion splicing equipment and techniques.

Figure 3:
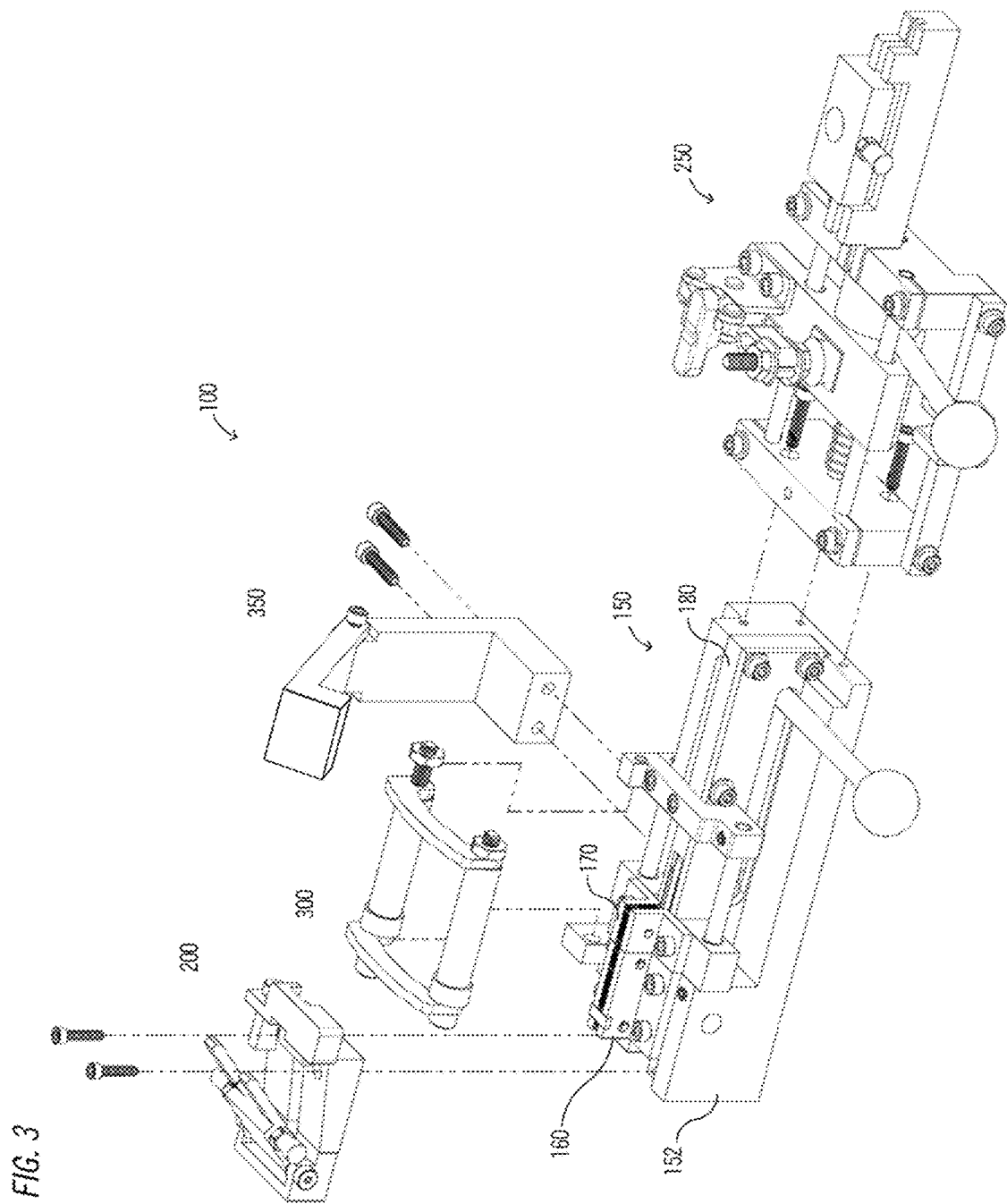
FIG. 3 shows an exploded perspective view of an exemplary implementation of a ribbon transition tool according to an aspect of the invention.

FIG. 3 shows an exploded perspective view of an exemplary implementation of a ribbon transition tool 100 according to an aspect of the invention. FIGS. 4-6 show, respectively, plan, elevation, and right side views of the assembled tool 100.

As shown in FIG. 3, the ribbon transition tool comprises the following groups of components, each of which is described in turn below:

A. base/comb subassembly 150, including:
    A1. a spreader comb 160;
    A2. a straight comb 170; and
    A3. an anvil lift subassembly 180;
B. a fiber tape holder subassembly 200;
C. a ribbon clamping and tensioning subassembly 250;
D. a ribbon tape holder subassembly 300; and
E. a ribbon tape press block 350.

In the following description, the ribbon transition tool is generally described as having a longitudinal axis (depicted as broken line 102 in FIG. 4). The "front end" of the tool is the end at which the fiber tape holder subassembly 200 is mounted. The "rearward end" of the tool is the end at which the ribbon clamping and tensioning subassembly 250 is mounted. As described below, a fiber ribbon is loaded into the tool front-to-back, with the the tip of the ribbon being loaded first at the front end of the tool and with the remaining ribbon being guided backwards along the tool's longitudinal axis and out its rearward end.

A. Base/Comb Subassembly

Figure 9:
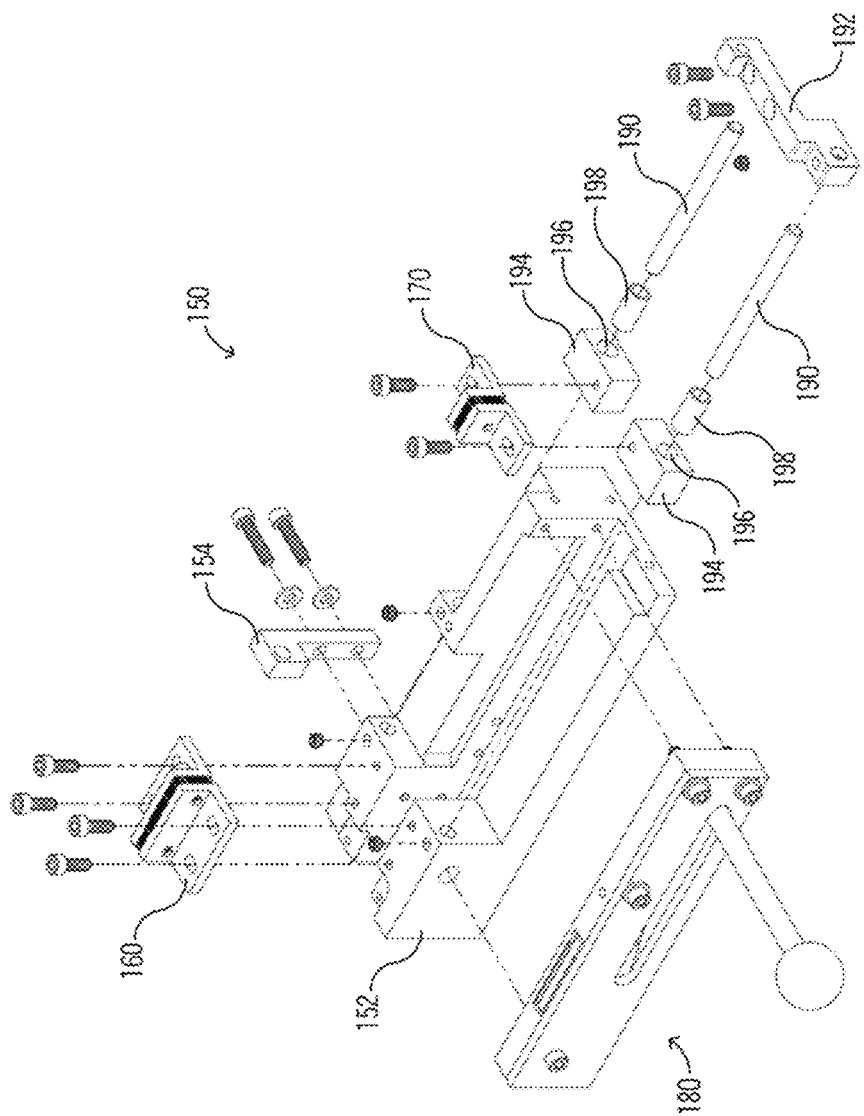
FIGS. 7-9 show, respectively, a plan view, an elevation view, and an exploded perspective of a base/comb subassembly.
Figure 7:
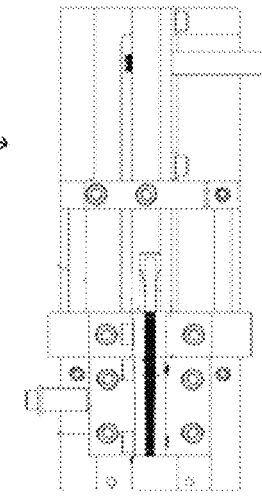
Figure 8:
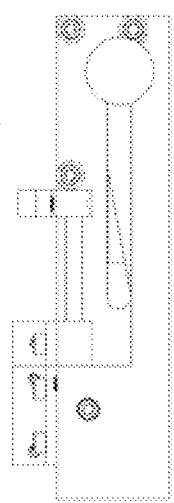

FIGS. 7-9 show, respectively, a plan view, an elevation view, and an exploded perspective of the base/comb subassembly 150. The base/comb subassembly 150 comprises a base 152, onto which are mounted a spreader comb 160, a straight comb 170, and an anvil lift subassembly 180.

The spreader comb 160 is fixedly mounted to the top surface of the base 152, close to its front end. The straight comb 170 is slidably mounted to the top surface of the base 152 behind the spreader comb 160, and is configured to slide along the top surface of the base between a first position, in which its front end abuts the rear end of the spreader comb 160, and a second position, in which there is a gap between the combs 160 and 170.

Two blocks 194 are mounted to the bottom of the straight comb 170. The straight comb 170 is guided in its movement by a pair of guide rails 190 that, together with low-friction sleeves 196, fit through corresponding holes in the two blocks 194. The guide rails are held in place by cantilevered bracket 192 and by means of a plurality of suitably positioned holes in the base 152. The cantilevered bracket 192 also provides a backstop for the straight comb 170 as it is slid backwards. In addition, the cantilevered bracket and a second bracket 154 are used for mounting the ribbon tape holder subassembly 300 to the base 152.

The anvil lift subassembly 180 is used to lift an anvil to a raised position in which it fills the gap between the spreader comb and the straight comb after the straight comb has been slid to its rearward position.

The spreader comb 160, straight comb 170, and anvil lift subassembly 180 are now described in greater detail.

A1. Spreader Comb

Figure 10:
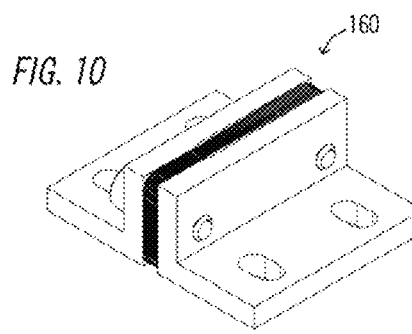
FIGS. 10 and 11 show, respectively, exploded and assembled perspective views of a spreader comb.
Figure 11:
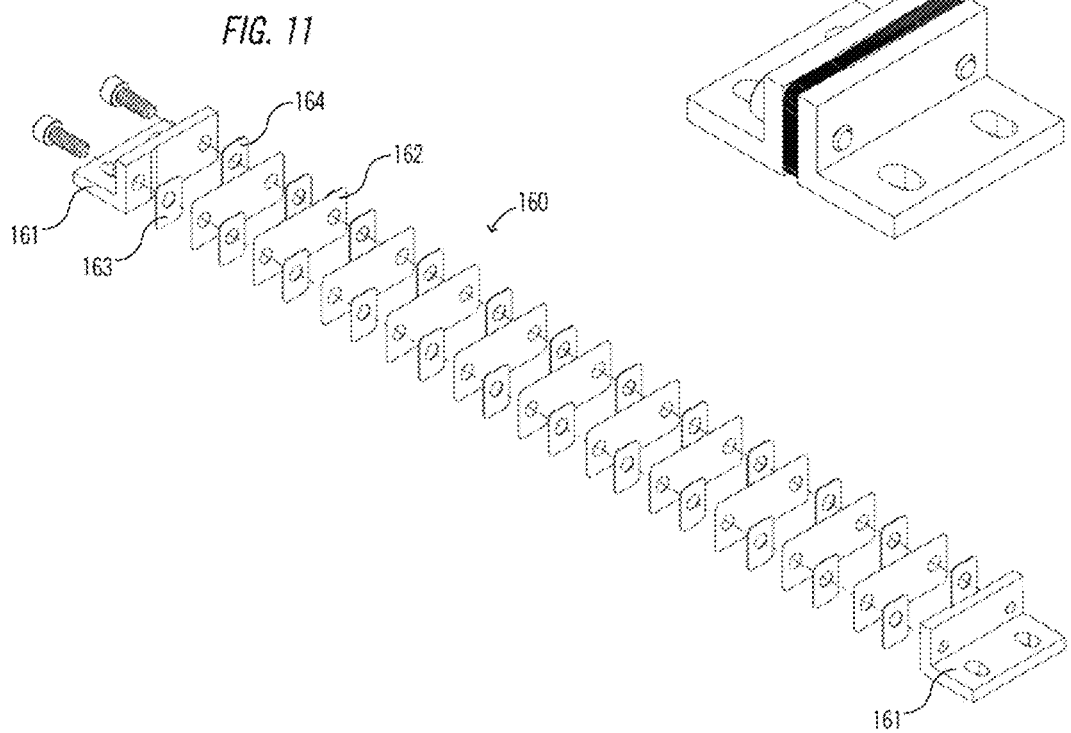

FIGS. 10 and 11 show, respectively, exploded and assembled perspective views of the spreader comb 160. The spreader comb comprises a pair of L-shaped end brackets 161, eleven tines 162, twelve front spacers 163, and twelve rear spacers 164 that are bolted together to form twelve fiber channels 165 (FIG. 12) corresponding to the twelve fibers of the 200 μm ribbon to be modified.

Figure 12:
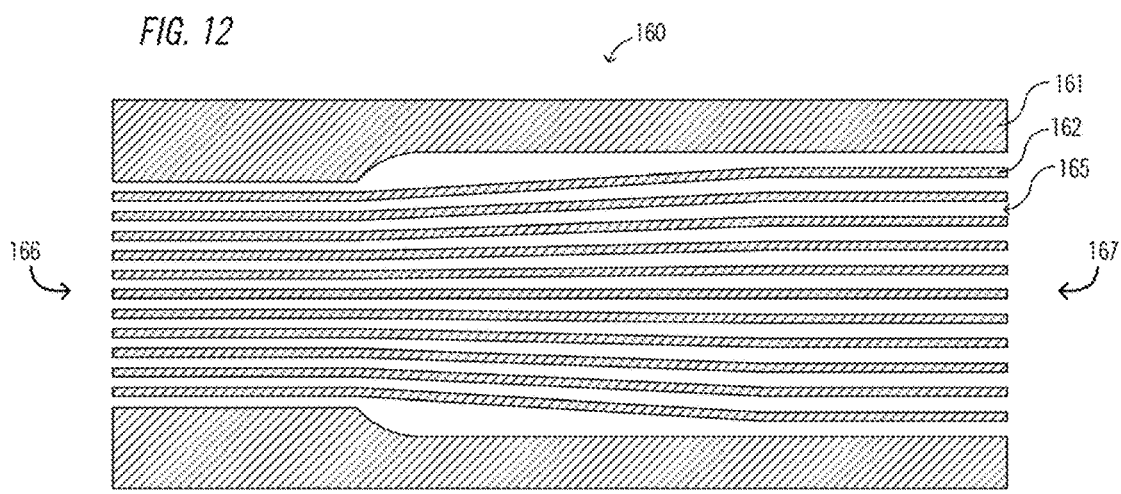
FIG. 12 shows a close-up view of the fiber channels in the assembled spreader comb.

FIG. 12 shows a close-up view of the fiber channels 165 in the assembled spreader comb 160. The channel spacing at the spreader comb's front end comb 166 (shown at the left in FIG. 12) is 200 µm, i.e, the same as the fiber ribbon. The channel spacing at the spreader comb's rearward end 167 (shown at the right in FIG. 12) is 250 µm, i.e., the same as the desired fiber spacing in the modified fiber.

The difference in spacing at the front end and the rear end of the spreader comb is accomplished by using spacers having different thicknesses. In the present practice of the invention, the tines have a thickness of approximately 50 µm. The front spacers have a thickness of approximately 150 µm, resulting in a channel spacing of 200 µm at the front end of the comb. The rear spacers have a thickness of approximately 200 µm, resulting in a channel spacing of 250 µm. The material to make the tines is sufficiently malleable such that tightening of the screws during the assembly of the spreader comb causes the tines to be bent into the desired final configuration.

A2. Straight Comb

Figure 13:
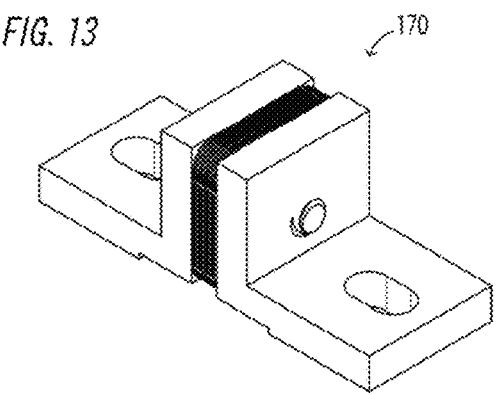
FIGS. 13 and 14 show, respectively, exploded and assembled perspective views of the straight comb.
Figure 14:
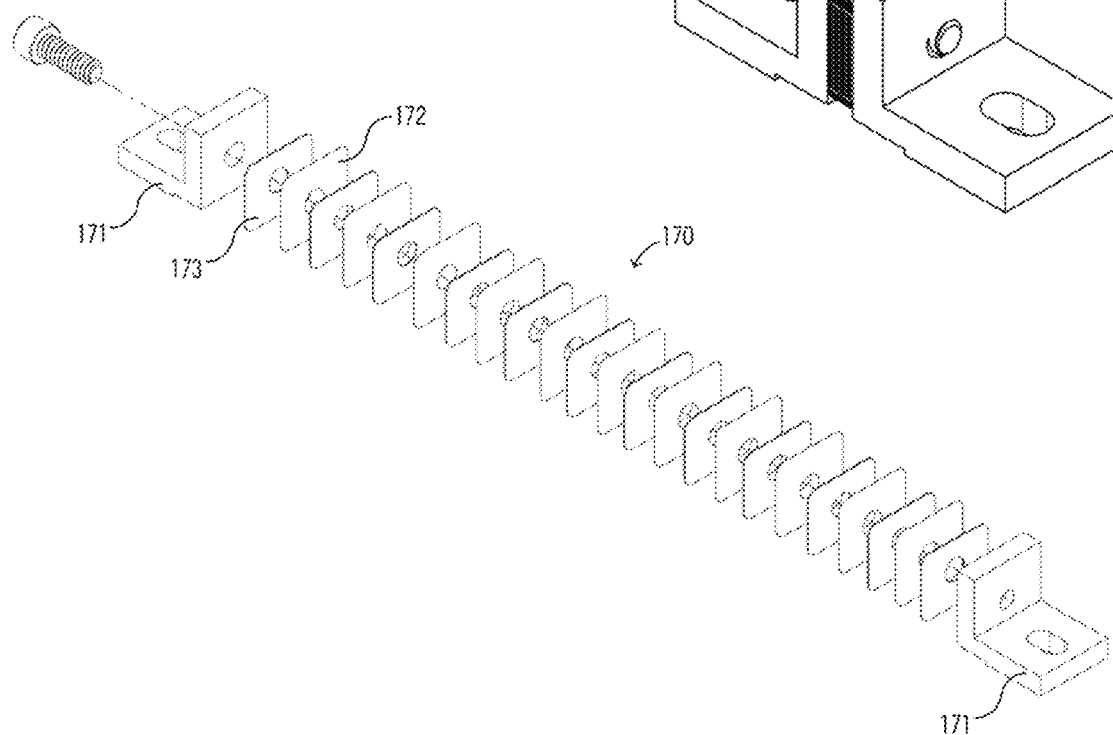

FIGS. 13 and 14 show, respectively, exploded and assembled perspective views of the straight comb 170. The straight comb comprises a pair of L-shaped end brackets 171, eleven tines 172 and 12 spacers 173 that are bolted together to form twelve fiber channels 175 (FIG. 15).

Figure 15:
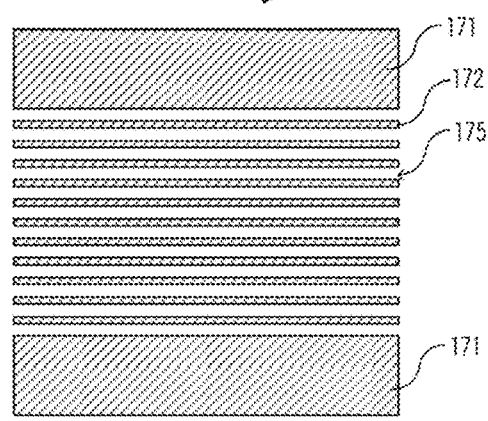
FIG. 15 shows a close-up view of the fiber channels in the assembled straight comb.

FIG. 15 shows a close-up view of the fiber channels in the assembled spreader comb. The channel spacing at both the front end and the rear end of the spreader comb is 250 µm, i.e., the same as the desired final fiber spacing.

Figure 16:
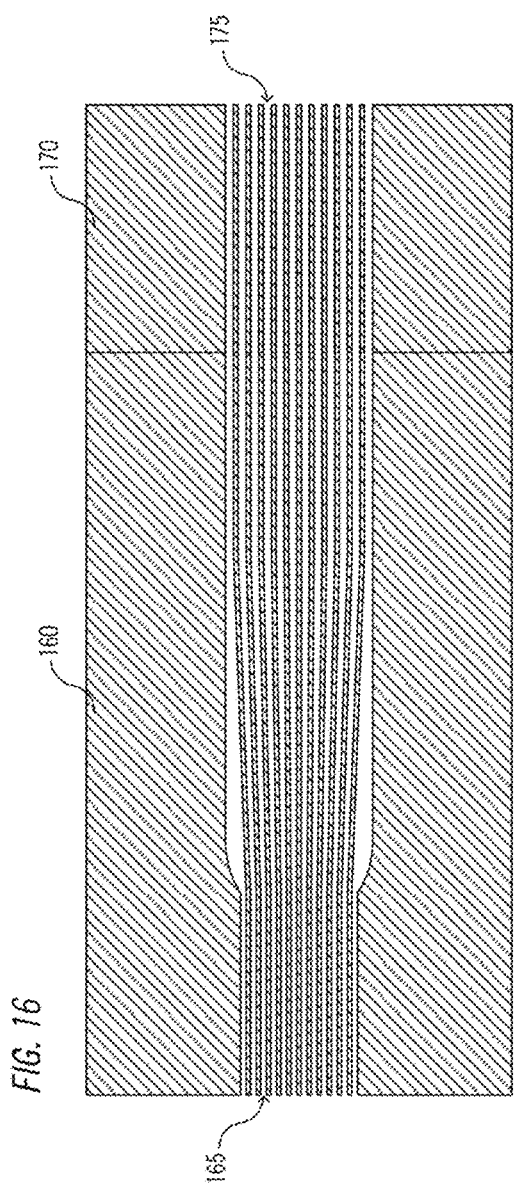
FIG. 16 shows a close-up view of the spreader comb and the straight comb when the straight comb is in its forward position, i.e., when its front end abuts the rear end of the spreader comb.

FIG. 16 shows a close-up view of the spreader comb 160 and the straight comb 170, when the straight comb is in its forward position, i.e., when its front end abuts the rear end of the spreader comb. It will be seen that the fiber channels at the rear end of the spreader comb line up with the channels at the front end of the straight comb. Thus, in this configuration, the two combs combine to form 12 continuous fiber channels, with a 200 µm spacing at the front end of the spreader comb and a 250 µm spacing at the rearward end of the straight comb.

Figure 17:
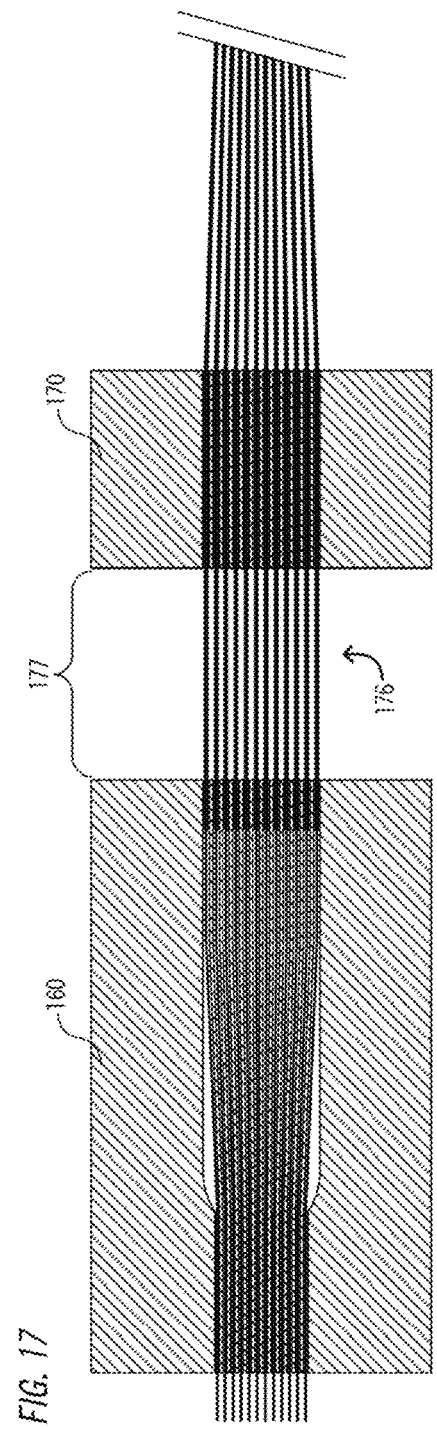
FIG. 17 shows a close-up view of the combs after an array of fibers has been loaded into their respective fiber channels, and after the straight comb has been slid to its rearward position.

FIG. 17 shows a close-up view of the combs after an array of fibers 176 has been loaded into their respective fiber channels, and after the straight comb 170 has been slid to its rearward position. It will be seen that there is now a gap 177 between the two combs, spanned by fibers 176. The fibers 176 are parallel to each other and having a spacing of 250 µm. As discussed below, an adhesive ribbon tape is applied over the fibers extending across the gap to maintain the desired 250 µm spacing.

A3. Anvil Lift Subassembly

FIGS. 18-20 show, respectively, a plan view, an elevation view, and an exploded view of the anvil lift subassembly 180. The purpose of the anvil lift subassembly 180 is to cause an anvil to be raised into the gap between the spreader comb and the straight comb.

The anvil lift comprises a base 181, a cover 182, an anvil 183, and a ramp 184 upon which the anvil rests. The ramp 184 is horizontally slidable and is operated by a handle 185 that is guided by a slot 186 in the anvil cover. When the handle is all the way to the back (i.e., to the right in the drawing figure), the anvil 183 is contained within the anvil base 181. When the handle is moved to the front (i.e., to the left in the drawing figure), the anvil 183 protrudes upward out of a slot 187 in the anvil base.

When mounted into the base/comb subassembly, the anvil lift subassembly 180 is located underneath the straight comb 170, and is positioned so that when the anvil 183 is in its retracted position, the anvil lift subassembly 180 does not interfere with the sliding of the straight comb 170. When the anvil 183 is lifted into its raised position, it fills the gap 177 between the spreader comb 160 and the straight comb 170, lying just underneath an array of fibers extending between the two combs.

B. Fiber Tape Holder Subassembly

Figure 23:
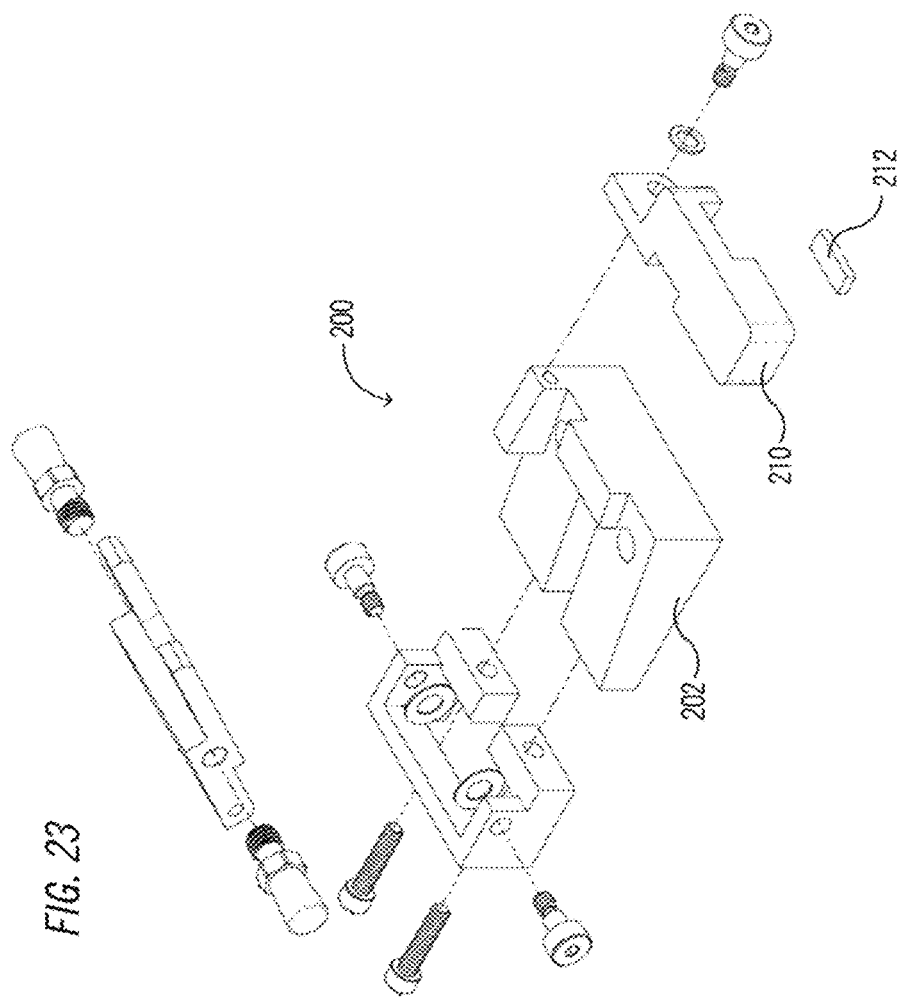
FIGS. 21-23 show, respectively, a plan view, an elevation view, and an exploded perspective view of a fiber tape holder subassembly.
Figure 21:
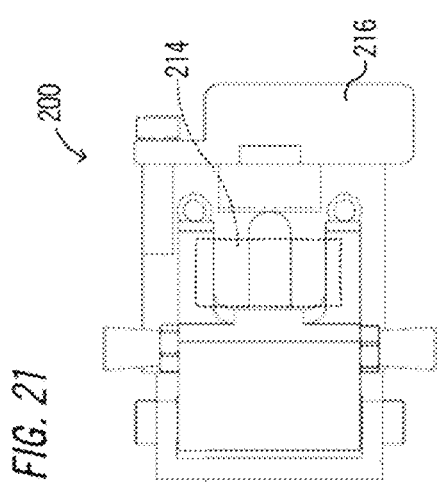
Figure 22:
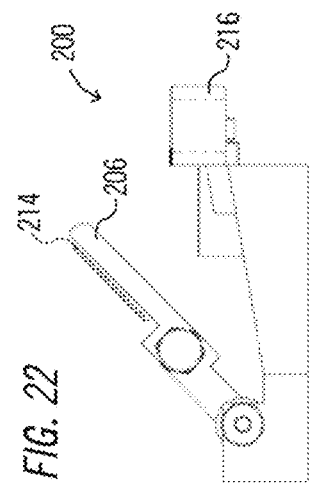

FIGS. 21-23 show, respectively, a plan view, an elevation view, and an exploded perspective view of a fiber tape holder subassembly 200 according to a further aspect of the invention.

The fiber tape holder subassembly 200 comprises a block 202, to which is mounted a bracket 204 that provides a hinge for a U-shaped fiber tape holding plate 206 for holding a segment of fiber tape 214. The block 202 includes a contact surface 208 that, as described below, is used as part of the process of anchoring the tip of the ribbon to the tool 100 at a point in front of the spreader comb 160.

The fiber tape holder subassembly 200 further includes a hingeably mounted retainer bar 210 having a silicone pad 212 mounted to its bottom surface. The retainer bar 210 is mounted to the fiber tape holder subassembly 200 such that the retainer bar 210 closes over the front end of the spreader comb 160, with the silicone pad 212 being urged against the front end of the fiber channels.

C. Ribbon Clamping and Tensioning Subassembly

FIGS. 24-26 show, respectively, a plan view, and an exploded perspective view of a ribbon clamping and tensioning subassembly 250, which is mounted to the rear end of the base/comb subassembly. One function of the ribbon clamping and tensioning assembly 250 is to anchor a fiber ribbon at a point behind the spreader comb 160 and straight comb 170.

The subassembly 250 comprises a front block 252 and a rear block 254 with three guide rails 256 extending therebetween. The guide rails 256 fit into corresponding holes in a slide block 258. A toggle clamp 260 is mounted to the top of the slide block 258. The toggle clamp 260 has a silicone clamping head 262 that is urged against a silicone pad 264 embedded into the slide block 258.

The subassembly 250 further includes a compression spring 266 and a handle 270 for urging the slide block 258 against the spring 266. The slide block 258 is locked into position so as to compress spring 266 by seating the shaft of the handle 270 into a lever stop bracket 272 having a suitably positioned U-shaped opening 274.

There is a ribbon guide 276 mounted to the back of the rear block 254, and includes a hinged cover 278. A pair of neodymium magnets 280 are mounted onto the ribbon guide 276 and the cover 278 to allow the cover to be temporarily locked in a closed position, as needed.

D. Ribbon Tape Holder

FIGS. 27-29 show, respectively, a plan view, an elevation view, and an exploded perspective view of a ribbon tape holder subassembly 300. The ribbon tape holder subassembly 300 comprises a pair of rollers 302 for holding a segment of ribbon tape. The rollers 302 are mounted to arms 304, and the assembled structure is hingeably mounted to the base 152 in a position that allows a segment of ribbon tape 306 to be lowered over an array of fibers extending across the gap between the spreader comb and the straight comb.

E. Ribbon Tape Press Block

Figure 32:
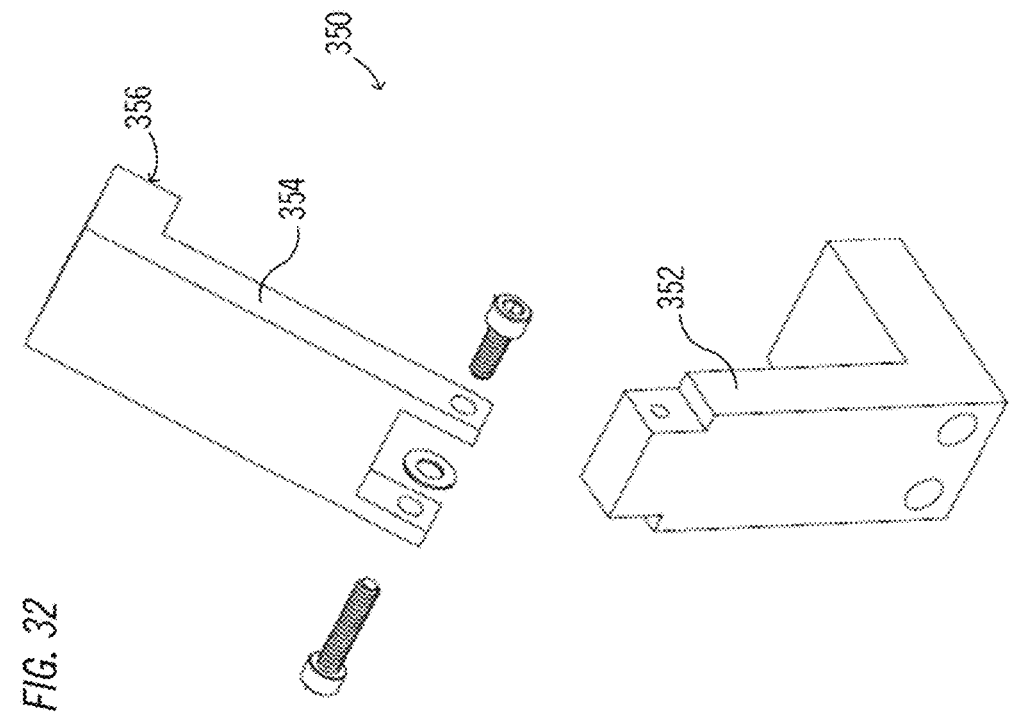
FIGS. 30-32 show, respectively, a plan view, a side view, and an exploded perspective view of a ribbon tape press block.
Figure 30:
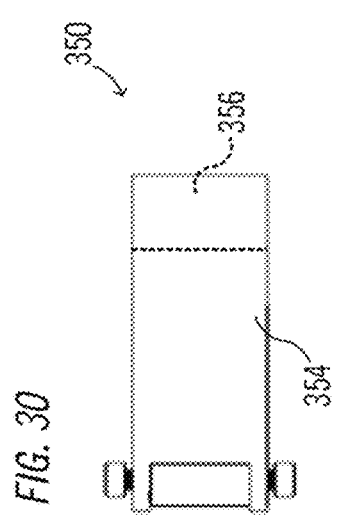
Figure 31:
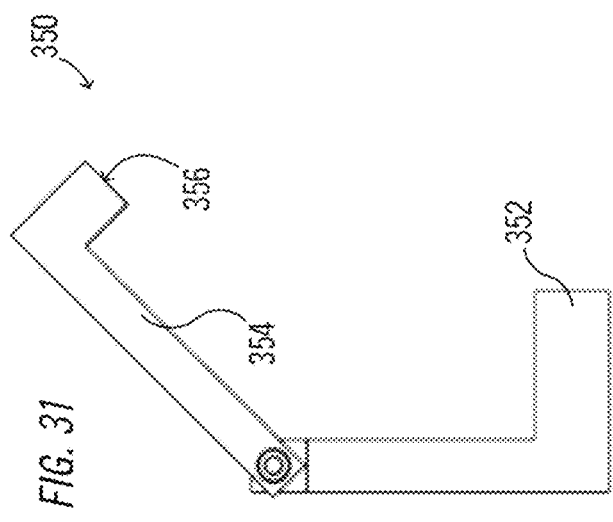

FIGS. 30-32 show, respectively, a plan view, a side view, and an exploded perspective view of the ribbon tape press block 350. The press block 350 comprises a base 352 and a hinged arm 354 having a flat contact surface 356. The press block 350 is mounted to the base in a position that allows the contact surface 356 to be pressed against a segment of ribbon tape placed on top an array of fibers extending across the gap between the spread comb and the straight comb.

Exemplary Technique

There is now described an exemplary technique for using the above-described ribbon transition tool for modifying an exemplary 200 μm fiber ribbon 360 for mass fusion splicing to a 250 μm fiber ribbon.

In addition to the ribbon transition tool 100, the following additional toolkit items are used in the described technique:

| Item | Example | Use |
| --- | --- | --- |
| thermal stripper | Fitel S218R | preparation of 200 μm ribbon |
| ribbon separator | Fitel S220A | preparation of 200 μm ribbon |
| tweezer with guide head | FIG. 39, discussed below | loading of 200 μm ribbon into tool |
| fine blade | FIGS. 40-41 discussed below | removal of excess ribbon tape |
| ribbon holder | Fitel S712A-012 | holding modified 200 μm ribbon |
| fiber cleaver | Fitel S326 | cleaving fibers for splicing |
| mass fusion splicer | Fitel S123 M12 (ver. 2) | splicing modified ribbon to 2nd ribbon |

The following items are also used: adhesive tape; fiber prep fluid and wipe; shrink-wrap tubes; canister of compressed air; and length measure tool (i.e., a ruler).

The following description is organized into the following sections:
1. Preparation of the Ribbon Transition Tool and a 200 μm Fiber Ribbon
2. Modification of the 200 μm Fiber Ribbon
3. Splicing of the Modified 200 μm Fiber Ribbon to a 250 μm Fiber Ribbon 1. Preparation of the Ribbon Transition Tool and a 200 μm Fiber Ribbon Compressed air is used to clean the ribbon transition tool, particularly the spreader comb and the straight comb.

The ribbon transition tool is initialized by ensuring that all of the movable tool components are in their correct starting positions. The anvil starts in its lowered position within the anvil lift subassembly. The straight comb starts in its forward position, in which it butts up against the spreader comb. The slide block of the clamping and tensioning is locked into its forward position, in which it causes the compression spring to be compressed. All of the other movable tool components are opened and/or disengaged as needed to ensure that they do not interfere with the techniques described below. These other components include the fiber tape holder, the retainer bar, the toggle clamp, the ribbon guide cover, the ribbon tape holder, and the ribbon tape press block.

In addition, segments of fiber tape and ribbon tape are loaded, respectively, into the fiber tape holder and the ribbon tape holder. As discussed below, the outer edges of the ribbon tape are cut away during the modification process. Care must be taken to handle the ribbon only by these outer edges.

An end of the 200 μm fiber ribbon is prepared by first using a thermal stripper to create a 1.5 inch stripped region at tip of ribbon. A ribbon separator is used to create a 2.75 inch deribbonized region immediately contiguous to stripped region. Fiber prep fluid is then used to clean the stripped region and deribbonized region.

2. Modification of the 200 μm Fiber Ribbon

FIGS. 33-38 show a series of simplified side views of the ribbon transition tool 100 that has been simplified for the purposes of illustrating the modification of an exemplary 200 μm ribbon 360 that has been prepared by stripping and deribbonizing as described above.

Figure 33:
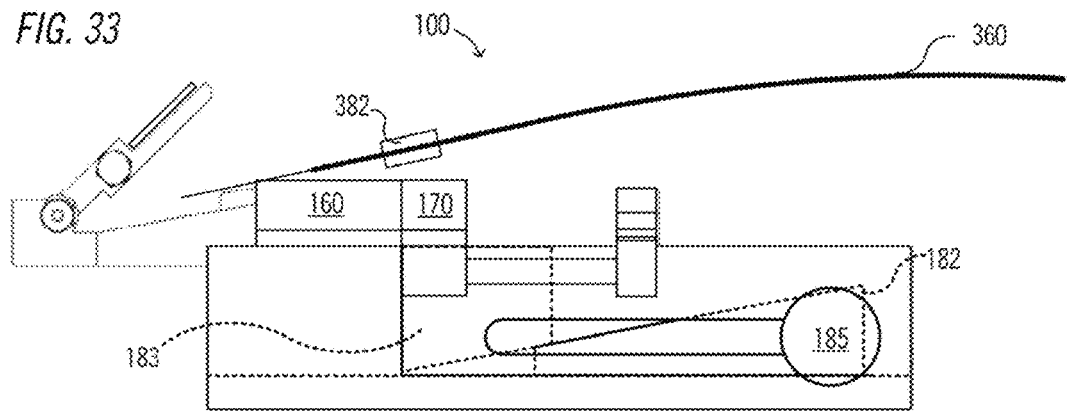
FIGS. 33-38 show a series of simplified side views of the base/comb subassembly that has been simplified for the purposes of illustrating the modification of an exemplary 200 μm ribbon that has been prepared by stripping and decarbonizing as described above.

As shown in FIG. 33, the fibers in the stripped region of the ribbon are guided into the fiber channels at the front end of the spreader comb. The ribbon is maneuvered by using a special pair of tweezers to grip the deribbonized region of the ribbon.

FIG. 39 shows a perspective view of the tweezers 380 used in an exemplary practice of the invention. The tweezers 380 are provided with a fiber-guiding head 382 that is used to grip the deribbonized region of the ribbon.

Assuming that the operator is using their right hand to grip the tweezers, the operator uses their left hand to hold the stripped region of the ribbon against the contact surface in the fiber tape holding means. The right hand places the tweezers aside and then grips the body of the ribbon to pull it backwards until only 0.125 inches of the deribbonized region is positioned over the spreader comb.

Figure 34:
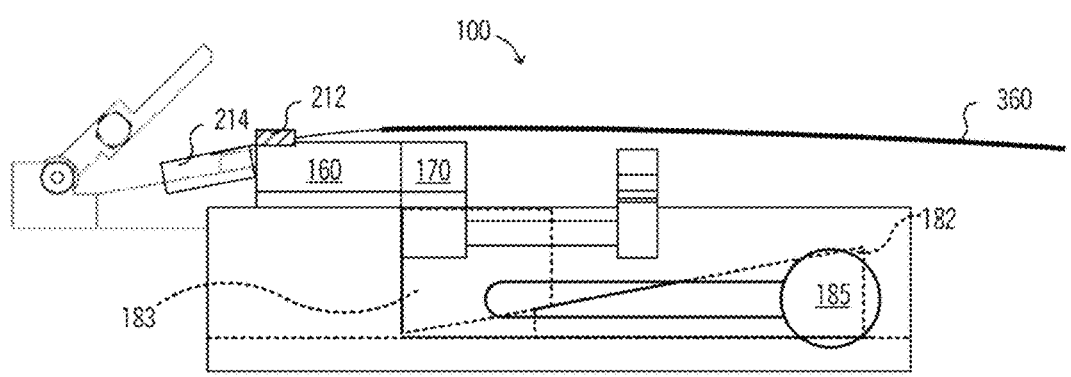

As shown in FIG. 34, the operator then uses the retainer bar to temporarily capture the stripped fibers and hold them in position until the fiber tape segment 214 can be applied over the tips of the stripped fibers in order to anchor them to the front end of the tool.

The operator then wicks the fibers into their respective fiber channels all the way through the spreader comb and the straight comb and guides the body of the ribbon through the clamping and tensioning subassembly and through the ribbon guide at the rearward end of the tool.

Figure 35:
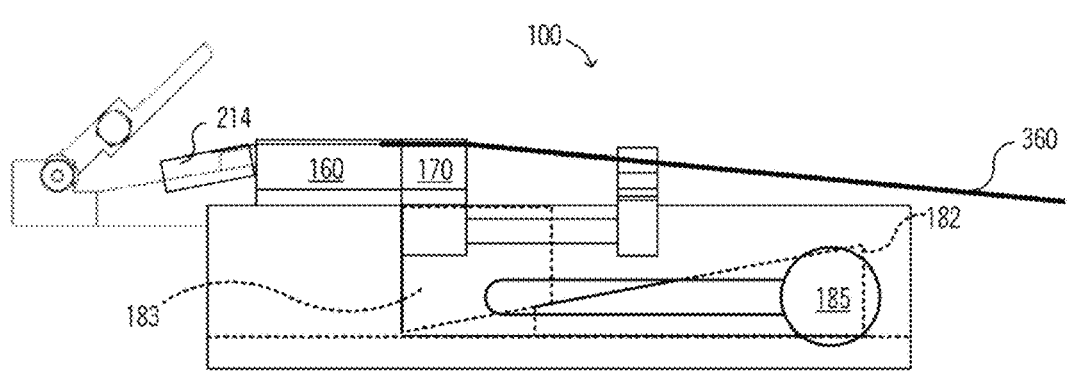

The operator then engages the toggle clamp to anchor the fibers at the rearward end of the tool. Once the toggle clamp has been engaged, the tensioning handle can be disengaged from the locking slot. The compression spring then exerts a tensioning force on the ribbon, causing it to be pulled taut between the front end and the rear end of the tool, as shown in FIG. 35.

Figure 36:
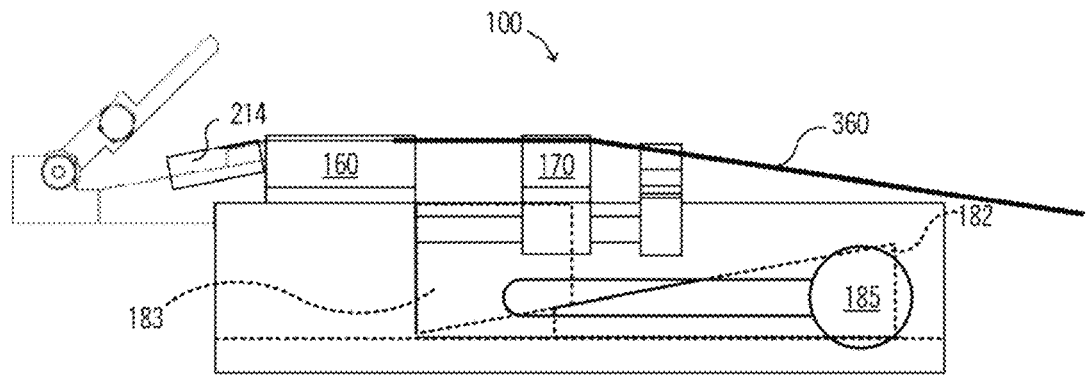

As shown in FIG. 36, the straight comb is now slid to its rearward position, resulting in a gap between the two combs. There is now a parallel array of deribbonized fibers extending between the two combs, with a spacing of 250 μm.

Figure 37:
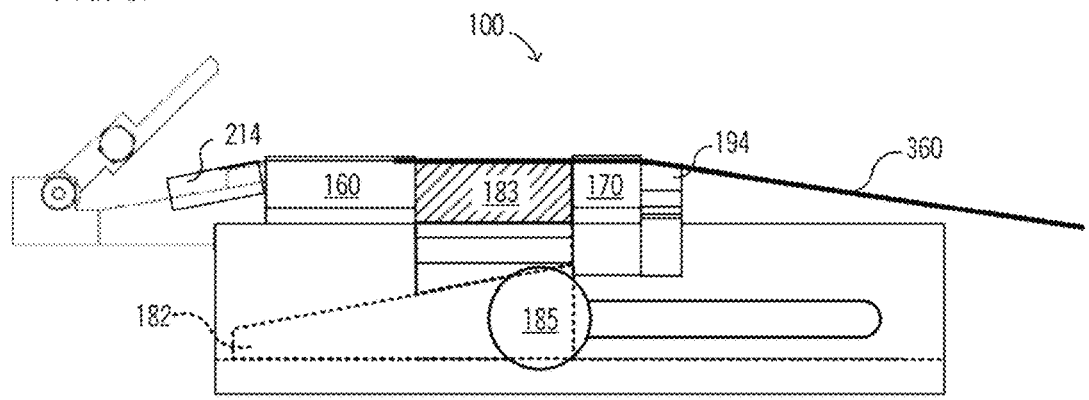

The anvil lift subassembly now engaged by sliding its handle forward, causing the anvil to be lifted up into the gap between the two combs, as shown in FIG. 37. The top surface of the anvil lies just beneath the array of fibers, and provides a supporting surface for the application of the ribbon tape 306 across the array of fibers.

Figure 38:
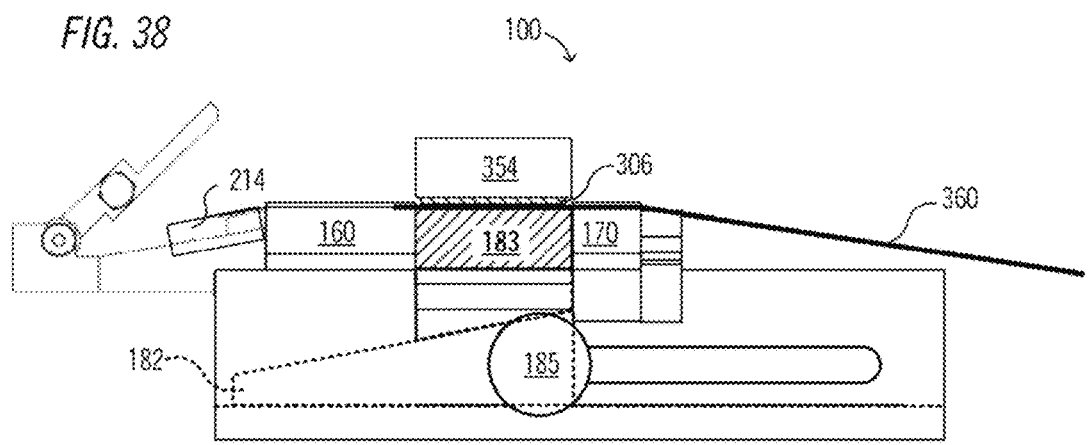

As shown in FIG. 38, the press block is now lowered over the ribbon tape to ensure a firm, even application of tape across the fiber array.

Once the ribbon tape is firmly in position, the press block is moved out of the way. A fine cutting tool is then used to trim away the outside edges of the ribbon tape. FIGS. 40 and 41 show, respectively, an exploded view and a perspective view of a feather razor 400 suitable for this function.

3. Splicing the Modified 200 μm Ribbon to a 250 μm Ribbon

The modified ribbon is now ready for loading into a mass fusion splicer for splicing to a conventional 250 μm ribbon.

The modified ribbon is loaded into a ribbon holder. The ends of the stripped fibers are cleaned using fiber prep fluid. The ribbon holder is loaded into a ribbon cleaver, and the stripped fibers are cleaved. The ribbon holder is then loaded into a mass fusion splicer, where the stripped fibers are spliced to the fibers of a conventional 250 μm ribbon that has been loaded into a matching ribbon holder. After the splice has been performed, a shrink-wrap tube is used to encase the splice ends of the two ribbons.

Other Types of Fiber Ribbon

It will be appreciated from the foregoing discussion that the above-described structures and techniques are applicable to other contexts in which first and second fiber ribbons having different fiber spacings are to be spliced together.

For example, a type of fiber ribbon has been developed that is rollable around the ribbon's longitudinal axis (i.e., cylindrically). FIGS. 42-44 show, respectively, a plan view, a side view, and a perspective view of an exemplary rollable fiber ribbon 420. Ribbon 420 comprises a plurality of individual coated fibers 422 that are arranged in a side-to-side configuration, and that are held together by patches of bonding material 424 that are applied in an alternating pattern along the length of the ribbon. FIG. 45 shows a perspective view of the ribbon 420 in a rolled configuration. The rollability of ribbon 420 provides for a more efficient use of space within a multi-ribbon cable.

A rollable fiber ribbon is commonly defined by a number of parameters, including:
  the axial length of the bonding part 426;
  the axial length of the non-bonding part 428;
  the axial length of the interval 430 (i.e., the "period" of the bonding pattern);
  the width of the ribbon; and
  the thickness of the ribbon.

When an individual rollable ribbon is spliced to a second ribbon, the rollable ribbon is unrolled into a flat configuration. On occasion, it is necessary for a rollable ribbon to be spliced to a second ribbon having a different fiber spacing.

FIG. 46 shows a table 440 setting forth the specifications for an exemplary short pitch rollable ribbon 450, an exemplary long pitch rollable ribbon 460, and an exemplary flat ribbon 470. The rollable ribbons 450 and 460 each comprise a respective array of coated fibers 452 and 462, and bonds 454 and 464. The flat ribbon 470 comprises an array of coated fibers 472 and a matrix 474 into which the coated fibers 472 are embedded. From table 440, it will be seen that the flat ribbon 470 has a width and thickness that are significantly different from that of the rollable ribbons 450 and 460. It would therefore be problematic to use a mass fusion splicer to splice one of the rollable ribbons 450 and 460 to the flat ribbon 470.

It will be appreciated that the above-described structures and techniques are applicable in such a context. Once a fiber ribbon has been unrolled into a flat configuration, the end of the ribbon can be stripped and deribbonized to produce an array of individual fibers that can be provided with a modified spacing using a fiber ribbon transition tool of the type described above.

General Technique

FIG. 47 shows a flowchart of a general technique 500 according to the invention, for increasing fiber-to-fiber spacing at an end of a first fiber ribbon to be spliced to a second fiber ribbon having a larger fiber-to-fiber spacing, comprising the following steps:

501: Provide a ribbon transition tool according to the present invention and initialize it by placing the anvil, straight comb, and clamping platform into their respective initial positions, with the clamping platform locked into place, and loading the fiber and ribbon tape holders, respectively, with fiber tape and ribbon tape.

502: Prepare the end of the fiber ribbon by stripping an end portion thereof to leave a plurality of individual bare fibers and deribbonizing an additional contiguous portion thereof to a plurality of coated individual fibers.

503: Load the tips of the individual bare fibers into respective individual fiber channels, using tweezers with a fiber alignment head, at the front end of the spreader comb and applying a fiber tape over them to hold them together.

504: Lay the individual bare fibers along the length of the individual channels and clamping the fiber ribbon into position on the clamping platform.

505: Release the clamping platform lock, thereby allowing the biasing spring to exert a tensioning force on the fiber.

506: Slide the straight comb into its rearward position.

507: Raise the anvil.

508: Apply ribbon tape to the tape region, and trimming away excess ribbon tape.

509: Release the toggle clamp.

510: Remove the taped ribbon.

Conclusion

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A ribbon transition tool for forming, at an end of a fiber ribbon having an initial fiber spacing, a fiber array having a modified fiber spacing, comprising:

a base having a front end and a rear end, and a spreader comb and a straight comb each having front and rear ends, wherein the spreader comb is fixedly mounted at the front end of the base, and wherein the straight comb is slidably mounted to the base between a forward position in which the front end of the straight comb abuts the rear end of the spreader comb, and a rearward position, in which there is a gap between the front end of the straight comb the rear end of the spreader comb, wherein the spreader comb and the straight comb each comprise a respective set of tines that define a plurality of individual fiber channels extending from the front end of the spreader comb to the rear end of the straight comb, wherein the plurality of individual fiber channels corresponds to individual fibers in the fiber ribbon, wherein, at the front end of the spreader comb, the plurality of individual fiber channels has a spacing matching the initial spacing of the fiber ribbon, and wherein, at the rear end of the spreader comb and throughout the straight comb, the plurality of individual fiber channels has a spacing matching the modified fiber spacing, wherein the tool further includes an anvil movably mounted into the base between a lowered position, in which the anvil is positioned underneath the straight comb in its forward position, and a raised position, in which the anvil is positioned to fill the gap between the rear end of the spreader comb and the front end of the straight comb in its rearward position, and means for anchoring the fiber ribbon at a first point in front of the spreader comb and means for anchoring the fiber ribbon at a second point behind the straight comb.

2. The tool of claim 1, further including:

a ribbon tape holder hingeably mounted to the base proximate to the anvil for placing a segment of ribbon tape onto individual fibers extending between the spreader comb and the straight comb.

3. The tool of claim 1, wherein the means for holding the fiber ribbon comprises:

a fiber tape holder subassembly mounted to the front end of the base for applying a fiber tape to individual fibers extending from the end of the fiber ribbon, and a ribbon clamping and tensioning subassembly mounted to the rear end of the base for clamping the fiber ribbon into a fixed position and applying a controlled tension thereto.

4. The tool of claim 3, wherein the fiber tape holder subassembly comprises:

a retainer bar hingeably mounted to the fiber tape holder subassembly for temporarily capturing individual fibers extending from the end of the fiber ribbon until a fiber tape is applied across the individual fibers.

5. The tool of claim 4, wherein the fiber tape holder subassembly comprises:

a fiber tape holder for holding a segment of fiber tape to be applied to individual fibers extending from the end of the fiber ribbon.

6. The tool of claim 3, wherein the ribbon clamping and tensioning subassembly comprises a platform that is mounted to the back end of the base so as to be movable between a forward position towards the base and a backward position away from the base, and a clamp for clamping the fiber ribbon to the platform, wherein a biasing spring mounted between the base and the platform biases the platform towards its backward position, wherein the ribbon clamping and tensioning subassembly further comprises a locking mechanism for holding the platform in a forward, biased position.

7. A method for increasing fiber-to-fiber spacing at an end of a first fiber ribbon to be spliced to a second fiber ribbon having a larger fiber-to-fiber spacing, comprising:

(a) providing a tool according to claim 1 and initializing it by placing the anvil, straight comb, and clamping platform into their respective initial positions, with the clamping platform locked into place, and loading the fiber and ribbon tape holders, respectively, with fiber tape and ribbon tape;

(b) preparing the end of the fiber ribbon by stripping an end portion thereof to leave a plurality of individual bare fibers and deribbonizing an additional contiguous portion thereof to a plurality of coated individual fibers;

(c) loading the tips of the individual bare fibers into respective individual fiber channels, using tweezers with a fiber alignment head, at the front end of the spreader comb and applying a fiber tape over them to hold them together;

(d) laying the individual bare fibers along the length of the individual channels and clamping the fiber ribbon into position on the clamping platform;

(e) releasing the clamping platform lock, thereby allowing the biasing spring to exert a tensioning force on the fiber;

(f) sliding the straight comb into its rearward position;

(g) raising the anvil;

(h) applying ribbon tape to the tape region, and trimming away excess ribbon tape;

(i) releasing the toggle clamp; and (j) removing the taped ribbon.

8. The method of claim 7, wherein the fiber ribbon is a rollable ribbon that is unrolled into a flat configuration prior to loading into the tool.

* * * * *